Figure 6:
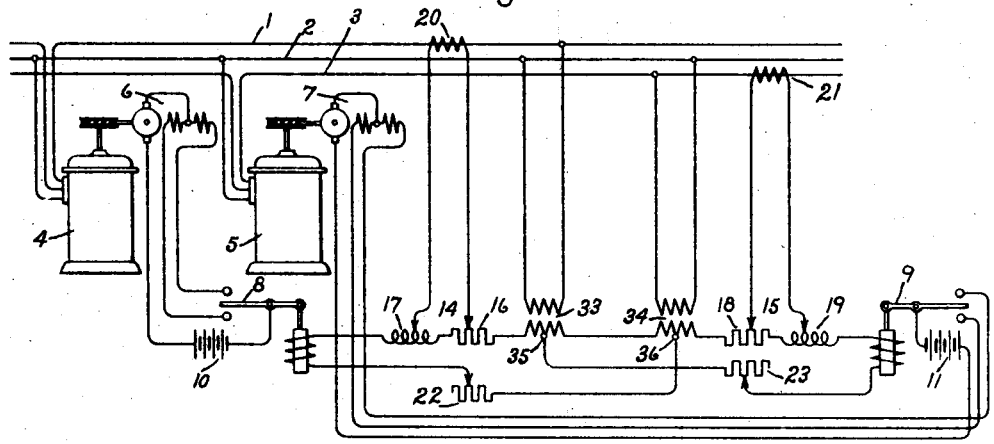

June 16, 1931.   F. J. CHAMPLIN   1,810,596
ELECTRICAL REGULATING SYSTEM
Filed Aug. 18, 1930   2 Sheets-Sheet 1
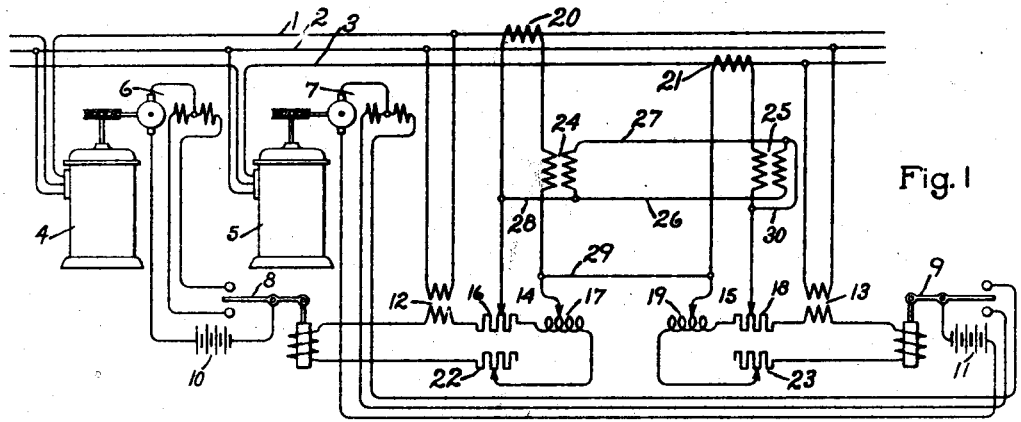
Fig. 1
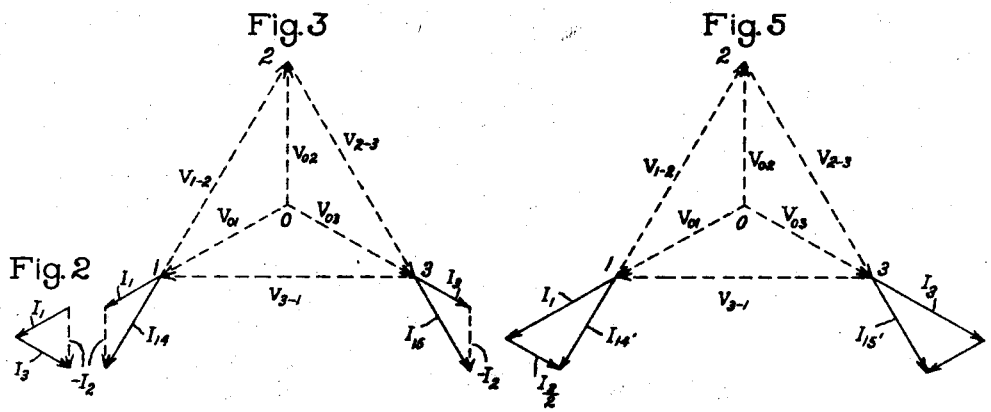
Fig. 3   Fig. 5
Fig. 2
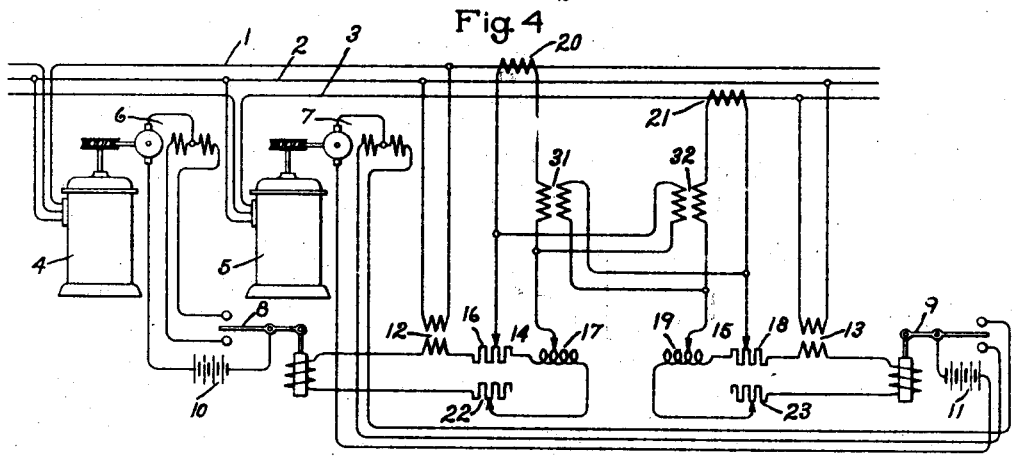
Fig. 4
Inventor:
Franklin J. Champlin,
by
His Attorney.

Inventor:
Franklin J. Champlin,
by Charles E. Tullar
His Attorney.

Patented June 16, 1931

1,810,596

UNITED STATES PATENT OFFICE

FRANKLIN J. CHAMPLIN, OF DALTON, MASSACHUSETTS, ASSIGNOR TO GENERAL ELECTRIC COMPANY, A CORPORATION OF NEW YORK

ELECTRICAL REGULATING SYSTEM

Application filed August 18, 1930. Serial No. 475,935.

This invention relates generally to the regulation of three-phase, three-wire alternating current circuits and particularly to connections for obtaining true line drop compensation when two single-phase regulators are employed.

The fact that the line voltages of any three-phase circuit, when considered as vectors, form a triangle has led to the use of two single-phase regulators for regulating such circuits, for, joining the ends of two proportionately extended sides of a triangle creates a triangle which is similar to the first. It is thus seen that when two single-phase regulators are used no phase angle distortion takes place under balanced conditions.

As this arrangement has a flexibility not equalled by a single three-phase regulator and as single-phase regulators are usually more readily available than three-phase regulators this way of regulating three-phase circuits has become quite common.

As the regulators and their control equipment are bulky they are usually placed a considerable distance from the actual point of application of the load or loads. There is consequently a voltage drop in the circuit between the load and the point where the voltage responsive control mechanism of the regulators is connected to the circuit. Therefore changes in load causes changes in this voltage drop with the result that constant voltage is not maintained at the load, where it should be, but out on the line where the voltage responsive control element is connected to the circuit.

It is not feasible, in most cases, to connect the voltage responsive control element to the regulated circuit at the point of application of the load, because of the necessity of running an additional circuit back to the regulator. Hence it is common to provide what is termed a line drop compensator to correct for the line drop. This compensator is an element which produces a weakening effect on the voltage responsive element in proportion to the line current, thus causing the regulator to hold a higher voltage as the load increases. It may be either an additional winding on the usual contact making voltmeter core or an element producing a counter voltage in the circuit of the usual contact making voltmeter coil.

In three-phase distribution circuits the line voltages and currents are not in phase at unity power factor. Consequently true line drop compensation cannot be obtained by merely connecting the contact making voltmeter to be responsive to a line voltage and the line drop compensator to be responsive to a line current, as the current and voltage effects produced on the contact making voltmeter will then not have a phase relation corresponding to the phase relation of current and voltage in the circuit. The reason that it is necessary that these phase relations correspond in order to obtain true line drop compensation is because the line drop is a vector resultant, generally composed of unequal quadrature resistance and reactance components, whose phase angle is determined by the power factor of the circuit. Thus at a given load there is a particular amount of line drop compensation which should correspond with each value of power factor.

Means for making the connections between the three circuit conductors, on the one hand, and the voltage responsive elements and the line drop compensators, on the other hand, of the two regulators, so as to obtain true line drop compensation, have been devised in the past but they invariably involve the use of at least three line current transformers, with their attendant cost and potentialities as weak points in the circuit. My invention, however, requires only two currents to be obtained from the three-phase circuit, preferably, but not necessarily, by line current transformers.

It is an object of my invention to provide a simplified electrical regulating system.

It is another object of my invention to provide a simplified and inexpensive system of connections for obtaining true line drop compensation when a three-phase circuit is regulated by two single-phase regulators.

My invention will be better understood from the following description taken in connection with the accompanying drawings, and its scope will be pointed out in the appended claims.

Figure 7:
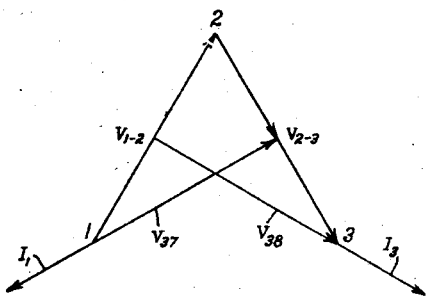

In the drawings, Fig. 1 is a diagrammatic representation of a preferred embodiment of my invention; Figs. 2 and 3 are vector diagrams for explaining the operation of the embodiment illustrated in Fig. 1; Fig. 4 is a diagrammatic illustration of a modified form of my invention; Fig. 5 is a vector diagram for explaining the operation of the modification shown in Fig. 4; Fig. 6 represents diagrammatically still another modification of my invention; while Fig. 7 is a vector diagram for explaining the operation of Fig. 6.

Referring now to Fig. 1, conductors 1, 2, and 3 comprise a section of a three-phase alternating current circuit in which it will be assumed that the power flow is from left to right as viewed in the drawings. Single-phase regulators are connected in conductors 1 and 3 of this circuit. These regulators may be of any suitable type such as induction regulators or contactor operated step type regulators. As shown, however, they comprise conventional induction voltage regulators which are designated in the drawings by characters 4 and 5. Any suitable operating mechanisms may be employed for operating these regulators and as shown the conventional reversible servo-motors 6 and 7 are mechanically connected respectively to regulators 4 and 5 to operate them. Any suitable voltage responsive control elements may be employed to control the operation of servo-motors 6 and 7, the conventional contact making voltmeters 8 and 9 being illustrated. Suitable sources of energy 10 and 11 are connected respectively between motor 6 and contact making voltmeter 8 on the one hand, and motor 7 and contact making voltmeter 9 on the other hand. Thus the engagement of the movable contact of either contact making voltmeter with one or the other of its fixed contacts will determine which one of the reversing field windings of the servo-motors is energized, and consequently will determine the direction of operation of these motors and hence the amount of voltage buck or boost introduced by the regulators in the conductors in which they are connected.

The operating solenoid of each contact making voltmeter is connected to a control system comprising a circuit including a secondary winding of a potential transformer whose primary winding is connected between two of the conductors of the three phase circuit, a line drop compensator and an adjustable rheostat. The line drop compensators are each energized by line current transformers connected in the circuit conductors in which their associated regulators are connected. Thus the control system for contact making voltmeter 8 comprises the potential transformer 12 whose primary winding is connected between conductors 1 and 2 and whose secondary winding is connected in the control circuit, a line drop compensator comprising an adjustable resistance 16 and an adjustable reactance 17 across which is connected the secondary winding of the current transformer 20 connected in conductor 1. An adjustable resistance 22 is also included for adjusting the control circuit for different normal voltage values and for different values of line drop compensation as determined by the adjustment of the resistance 16 and reactance 17. Likewise, the control system for contact making voltmeter 9 comprises a potential transformer 13 having its primary winding connected between circuit conductors 2 and 3 and its secondary winding connected in the control circuit, a line drop compensator 15 comprising an adjustable resistance 18 and an adjustable reactance 19, across which is connected the secondary winding of line current transformer 21 whose primary winding is connected in conductor 3. An adjustable resistance 23 similar to adjustable resistance 22 and for the same purpose is also connected in the control circuit of contact making voltmeter 9.

In order to introduce in each of the line drop compensators a component current which, when combined with the original current flowing therein, will produce a resultant current which is in phase with the voltage in each control circuit produced by its respective potential transformer, I provide an interconnection therebetween consisting of two one-to-one ratio current transformers 24 and 25 whose primary windings are connected respectively in series with the secondary windings of line current transformers 20 and 21 and whose secondary windings are connected in parallel by means of conductors 26 and 27, these secondary windings then being connected in a series circuit including line drop compensators 14 and 15 by means of conductors 28, 29, and 30.

The operation of the embodiment of my invention illustrated in Fig. 1 is as follows. Assume that the three-phase circuit comprising conductors 1, 2, and 3 is energized by a suitable source of current and that no current flows in this circuit. Under these circumstances line current transformers 20 and 21 will not be energized and the only voltage applied to each of the contact making voltmeter elements will be the voltages derived from potential transformers 12 and 13. If the voltage on the three-phase circuit rises, this rise in voltage will be transmitted by the potential transformers to the contact making voltmeters thereby causing an increase in the energization of their operating elements with the result that their movable contacts cooperate with their lower fixed contacts to energize the respective servo-motors of the regulators in the proper direction to insert a voltage buck in their respective circuit conductors. This action will continue until the voltage returns to normal, at which time the contact making voltmeters will again balance and break the circuits of the servo-motors to which they are connected. In a similar manner a decrease in the voltage of the three-phase circuit will unbalance the contact making voltmeters in a manner to cause them to operate the servo motors in a reverse direction thereby to cause the voltage regulators to insert a voltage boost in the three-phase circuit.

The voltage regulators 4 and 5 are well known in the art and comprise essentially auto-transformers having fixed secondary windings connected in the line conductors and rotatable primary windings connected between two of the conductors. Thus, by rotating the primary winding with respect to the secondary winding a variable voltage is induced in the latter which may be made zero when the axes of the windings are at right angles and either bucking or boosting when the axes of the windings are parallel.

If now a load is connected to the circuit comprising conductors 1, 2, and 3 in such a manner as to cause a power flow in this circuit from left to right a current will flow in the conductors of this circuit. This will cause a voltage drop in the circuit between the source of current supply and the point where the contact making voltmeters are connected to it, thus causing these devices to operate the regulators in a manner to insert a voltage boost in the circuit thereby to restore the voltage to normal at this point. There will, however, be an additional voltage drop between the point where the contact making voltmeters are connected to the circuit and the point of application of the load which will result in a decrease in voltage at the load, even though the voltages are held constant at the point where the contact making voltmeters are connected to the circuit. It is in order to compensate for this voltage drop that the line drop compensators 14 and 15 are provided.

The resistance and the reactance of these compensators in each of the control circuits are proportional to the resistance and the reactance of the conductors of the three-phase circuit so that if a current flows through them which is proportional to the current flowing in the conductors of this circuit a voltage drop will be produced across their terminals which is proportional to the voltage drop in the conductors of the circuit. This is what actually takes place because these compensators are connected in circuits 1 and 3 by means of the line current transformers 20 and 21. However, as previously pointed out, the current flowing in conductor 1, which is proportional to the current flowing in the secondary winding of line current transformer 20 is not in phase at unity power factor with the voltage between conductors 1 and 2. This is clearly seen from the vector diagram shown in Fig. 3, wherein $V_{01}$, $V_{02}$, and $V_{03}$ represent the leg voltages of the three-phase circuit, $I_1$ and $I_3$ represent the line currents flowing in conductors 1 and 3 and $V_{1-2}$ and $V_{2-3}$ represent the line voltages between conductors 1—2 and 2—3 respectively. From this it is clear that $I_1$ and $V_{1-2}$ are not in phase and likewise $I_3$ and $V_{2-3}$ are not in phase. Therefore, with merely the line current transformers 20 and 21 energizing the line drop compensators the conditions in the control circuits of the contact making voltmeters will not represent true conditions on the three-phase circuit because the voltage drop produced in the line drop compensator, which is connected so as to oppose the voltage produced by the potential transformer will not be in phase with the latter at unity power factor, and it is in order to bring these voltages in phase that one to one ratio current transformers 24 and 25 are provided. The way that this is accomplished will be clear when the vector diagram in Fig. 2 is considered for in this diagram $I_1$ represents vectorially the current flowing in the secondary winding of current transformer 24, while $I_3$ represents vectorially current flowing in the secondary winding of current transformer 25. As these secondary windings are connected in parallel the total current flow in conductor 28 will be the vector sum of currents $I_1$ and $I_3$, which is shown in the vector diagram as being equal to $-I_2$. As this current $-I_2$ must flow in the line drop compensators 14 and 15 because of the connections made by conductors 28, 29, and 30, this current is added vectorially to the currents $I_1$ and $I_3$ in line drop compensators 14 and 15 respectively. Fig. 3 shows vectorially this addition and shows that the resultant currents $I_{14}$ and $I_{15}$ flowing respectively in the line drop compensators 14 and 15 are in phase with the voltages $V_{1-2}$ and $V_{2-3}$ respectively. Thus at unity power factor the currents in each of the line drop compensators are in phase with the voltages produced in each of the control circuits by the potential transformers so that the resistance drops in each line drop compensator are in phase with the potential transformer voltages and opposing them while the reactance drops in the line drop compensators are in quadrature with these voltages. Conditions in the control circuits, therefore, represent in miniature the actual conditions in the three-phase circuit and true line drop compensation is secured, for as the voltage drops produced in line drop compensators oppose the potential transformer voltages the effective voltage on the contact making voltmeters will be decreased as the load current increases thereby to cause the regulators to hold the voltage sufficiently high to maintain constant voltage at some point, preferably the point of application of the load on the three-phase circuit.

In Fig. 4 I have illustrated another way of securing true line drop compensation by the use of two auxiliary current transformers. This figure differs from Fig. 1 in that in place of transformers 24 and 25 and conductors 26, 27, 28, and 29, two two-to-one ratio step-down current transformers 31 and 32 are provided. These transformers have their primary windings connected respectively in series with the secondary windings of line current transformers 20 and 21 and have their secondary windings cross connected so as to be connected in parallel respectively with the secondary windings of the current transformers 21 and 20.

The operation of this embodiment of my invention to secure true line drop compensation is illustrated by Fig. 5. Consider line drop compensator 14. This has a current designated as $I_1$ flowing in it and in addition has a current produced by current transformer 32, which is proportional to one half the current flow in line conductor 3, and which is designated in the vector diagram as vector $I_{3/2}$ flowing in it. As shown by the diagram the vector sum of these currents is equal to current $I_{14}$ which it will be seen is in phase with the voltage $V_{1-2}$, a proportional part of which is produced in the contact making voltmeters' circuit by potential transformer 12. In the same way the current in line drop compensator 15 is equal to current $I_{15'}$ which is in phase with the voltage $V_{2-3}$.

In Fig. 6 I have illustrated a way of obtaining true line drop compensation by shifting the phase of the voltage applied to the contact making voltmeter circuits rather than by shifting the phase of the current supplied to the line drop compensators. This figure differs from Figs. 1 and 4 in that instead of employing auxiliary current transformers for producing component currents in the line drop compensators special potential transformers 33 and 34 are provided which have mid-point taps 35 and 36 respectively brought out from their secondary windings. Each of the contact making voltmeter control circuits is connected so as to include a line drop compensator, the secondary winding of one of the potential transformers, and one half the secondary winding of the other potential transformer. Thus, considering the control circuit of the contact making voltmeter 8, it includes line drop compensator 14, secondary winding of potential transformer 33 and one half the secondary winding of potential transformer 34. Likewise, the control circuit of contact making voltmeter 9 includes line drop compensator 15, secondary winding of potential transformer 34 and one half the secondary winding of potential transformer 33.

The operation of the embodiment illustrated in Fig. 6 will be clear from the vector diagram shown in Fig. 7. In this figure $I_1$ is the current flowing in the line drop compensator 14 and $V_{37}$ is the resultant voltage produced by the potential transformers in the control circuit of contact making voltmeter 8. As shown $V_{37}$ is the result of two voltage $V_{1-2}$ which is the voltage produced by the secondary winding of potential transformer 33 and one half $V_{2-3}$ which is the voltage produced by the half of the secondary winding of potential transformer 33, which is connected in this control circuit. Likewise $V_{38}$ is the voltage produced by the potential transformer in the control circuit of the contact making voltmeter 9, the voltage being the vector result of voltage $V_{2-3}$ which is produced by the secondary winding of potential transformer 34 and one half of $V_{1-2}$, which is produced by the half of the secondary winding of potential transformer 33 which is connected in this control circuit. As the voltages $V_{37}$ and $V_{38}$ are in phase respectively with the currents $I_1$ and $I_2$, true line drop compensation is secured.

It is to be noted that in all of the vector diagrams the vectors representing the currents flowing in the line drop compensators make in one case a zero phase angle with the voltage associated with them in their control circuit and in the other case make a 180° phase angle with the voltage associated with them in their control circuit. They have been shown thus for the sake of clarity in understanding the vector diagrams. In actual practice, however, each of these currents will be in phase with their respective voltages because the voltage drops produced by these currents in their associated line drop compensators should oppose these voltages. This may be easily done by reversing the proper connections of either the potential transformers or the current transformers.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a three phase alternating current circuit, a pair of control circuits, means respectively connecting said control circuits in different conductors of said three phase circuit and between different conductors of said three phase circuit, and interconnecting means between said first mentioned means for causing the respective current components in said control circuits which are due to the connections in and between the conductors of said three phase circuit to be in phase at unity power factor.

2. In combination, a three phase alternating current circuit, a pair of control circuits, means including potential transformers connecting each of said control circuits between different conductors of said three phase circuit, means comprising only two current transformers connecting each of said control circuits in different conductors of said circuit, and interconnecting means between said first mentioned means arranged so that the currents in said control circuits produced by said current transformers are in phase with the potentials in said control circuits produced by said potential transformers at unity power factor.

3. In combination, a three phase alternating current circuit, regulating means connected to said circuit, control means for said regulating means, a pair of devices for producing voltages which are proportional respectively to two of the line to line voltages of said three phase circuit connecting said circuit to said control means, a pair only of devices for producing currents which are proportional respectively to two of the line currents of said three phase circuit connecting said three phase circuit to said control means, and interconnecting means between one pair of said devices for so modifying the phase of the electrical quantities produced thereby that they are in phase respectively with the electrical quantities produced by the other pair of devices at unity power factor.

4. In combination, a three phase alternating current circuit, regulating means connected to said circuit, a control system for said regulating means, means connecting said three phase circuit to said control system comprising a pair of potential transformers connected between different pairs of conductors of said circuit, and a pair of current transformers connected in different conductors of said circuit, said control means being provided with means for interconnecting one pair of transformers in such a manner that the electrical quantity of each secondary winding is in phase respectively with the electrical quantity in one of the secondary windings of said other pair of transformers at unity power factor.

5. In combination, a three phase alternating current circuit, a pair of line drop compensators, a pair of current transformers connected in two of the conductors of said circuit and means, including interconnecting means between the secondary windings of said current transformers, for energizing said line drop compensators from said transformers in such a manner that the currents in said line drop compensators are in phase respectively with two different line voltages of said circuit at unity power factor.

6. In combination, a three phase alternating current circuit, a pair of line drop compensators, a pair of line current transformers connected respectively to energize said line drop compensators in accordance with two of the line currents of said three phase circuit, and means energized by said line current transformers for circulating in said line drop compensators component currents which combine vectorially with the currents in said line drop compensators produced directly by said line current transformers to produce resultant currents in each line drop compensator which are in phase with different line voltages of said three phase circuit at unity power factor therein.

7. In combination, a three phase alternating current circuit, regulating means connected to said circuit, a control system for said regulating means, means connecting said control system to said three phase circuit comprising a pair of potential transformers whose primary windings are connected between different pairs of conductors of said three phase circuit and a pair of current transformers whose primary windings are connected in only two of the conductors of said three phase circuit, and interconnecting means between the secondary windings of said current transformers for producing resultant currents in the circuits thereof which are in phase with the currents in the secondary windings of said potential transformers at unity power factor.

8. A regulating system having, in combination, a three phase alternating current circuit, single phase induction voltage regulators connected respectively to two of the phases of said circuit, contact making voltmeters for controlling said regulators, potential transformers connected respectively to energize said contact making voltmeters in accordance with variations in the line voltages of the phases to which said regulators are connected, line drop compensators in circuit with each of said contact making voltmeters, current transformers connected respectively for energizing said line drop compensators in accordance with the current flow in the conductors of said three phase circuit in which said induction regulators are connected, and means energized by said line current transformers for circulating in said line drop compensators component currents which combine vectorially with the currents in said line drop compensators produced directly by said line current transformers to produce resultant currents in each line drop compensator which are in phase with the respective line voltages to which said potential transformers are responsive.

9. In combination, a three phase alternating current circuit, a pair of line current transformers connected respectively in different conductors thereof, compensating devices connected respectively to the secondary windings of said current transformers, and a circuit containing parallel connected secondary windings of two current transformers whose primary windings are in circuit respectively with the secondary windings of said line current transformers, said circuit also including said compensating devices.

10. In combination, a three phase alternating current circuit, line current transformers having their primary windings connected respectively in two of the conductors of said circuit, line drop compensators connected respectively to the secondary windings of said line current transformers, one to one ratio current transformers having their primary windings connected respectively in circuit with the secondary windings of said line current transformers, and a circuit including said line drop compensators in series and the secondary windings of said one to one ratio transformers in parallel.

11. A regulating system having, in combination, a three phase alternating current circuit, two single phase induction regulators connected respectively to two of the phases of said circuit, individual means responsive respectively to two of the line voltages of said circuit for controlling said regulators, line drop compensators associated with said controlling means, line current transformers connected respectively in the conductors of said circuit in which said regulators are connected for energizing said compensators, one to one ratio current transformers connected respectively to said line current transformers, the secondary windings of said one to one ratio transformers being parallel connected in a circuit including said line drop compensators.

12. A regulating system having, in combination, a three phase alternating current circuit, single phase induction voltage regulators connected respectively to two of the phases of said circuit, contact making voltmeters for controlling said regulators, potential transformers connected respectively to energize said contact making voltmeters in accordance with variations in the line voltages of the phases to which said regulators are connected, line drop compensators in circuit with each of said contact making voltmeters, current transformers connected respectively for energizing said line drop compensators in accordance with the current flow in the conductors of said three phase circuit in which said induction regulators are connected, one to one ratio current transformers having their primary windings connected respectively in circuit with the secondary windings of said line current transformers and their secondary windings connected in parallel, and a circuit including said parallel connected secondary windings and said line drop compensators.

13. In combination, a three phase circuit, a line drop compensator, means for passing through said line drop compensator a current which is proportional in magnitude and phase angle to the current in one of the conductors of said circuit and means for passing through said line drop compensator a current which is proportional in magnitude and phase angle to one half the current in another one of the conductors of said three-phase circuit, said currents flowing in said line drop compensator in such a way as to produce a resultant current which is in phase with one of the line voltages of said three-phase circuit at unity power factor.

14. In combination, a three-phase alternating current circuit, a pair of line current transformers connected respectively in different conductors of said circuit, compensating devices connected respectively to the secondary windings of said line current transformers, and current transformers respectively associated with said line transformers, each of said current transformers having its primary winding connected in series relation with the secondary winding of its associated line transformer and its secondary winding connected across the secondary winding of the other line transformer.

15. In combination, a three-phase alternating current circuit, a pair of line drop compensators, a pair of line current transformers connected respectively to energize said line drop compensators in accordance with the current in different conductors of said circuit, and a pair of two to one ratio step down current transformers having their primary windings connected respectively in series with the secondary windings of the line current transformers and their secondary windings cross connected across said line drop compensators.

16. A regulating system having, in combination, a three-phase alternating current circuit, two single-phase induction regulators connected respectively to two of the phases of said circuit, contact making voltmeters connected between different pairs of conductors of said circuit for controlling said regulators, line drop compensators associated with said contact making voltmeters, line current transformers connected respectively in the conductors of said three-phase circuit for energizing said line drop compensators, two to one ratio step down current transformers having their primary windings connected respectively in series with the secondary windings of said line current transformers and having their secondary windings cross connected across said line drop compensators.

17. In combination, a three-phase alternating current circuit, a control circuit, means for producing in said control circuit a voltage which is proportional in magnitude and phase angle to one of the line voltages of said three-phase circuit, means for producing in said control circuit a voltage which is proportional in magnitude and phase angle to the voltage drop in one of the conductors of said three-phase circuit, and means for producing an additional voltage in said control circuit which is proportional in magnitude and phase angle to one half of another one of the line voltages of said circuit.

18. In combination, a three phase alternating current circuit, current transformers having their primary windings in two of the conductors of said circuit, line drop compensators connected to the secondary windings of said line current transformers, potential transformers having their primary windings connected between different pairs of conductors of said three-phase circuit, and two control circuits each containing in series one line drop compensator, one potential transformer secondary winding and one-half of the secondary winding of the other potential transformer.

19. A regulating system having, in combination, a three-phase alternating current circuit, single-phase induction regulators connected to two of the phases of said three-phase circuit, contact making voltmeters for controlling said regulators, control circuits for said contact making voltmeters, line drop compensators in said control circuits, line current transformers for energizing said line drop compensators, potential transformers connected respectively to produce in each control circuit a voltage which is proportional to a different line voltage of said three-phase circuit, said potential transformers also being connected to produce in each control circuit a voltage which is proportional to one half the line voltage whose proportional part is produced in the other control circuit.

In witness whereof, I have hereunto set my hand this eleventh day of August, 1930.

FRANKLIN J. CHAMPLIN.